(12) United States Patent
Webb, II

(10) Patent No.: US 12,622,832 B2
(45) Date of Patent: May 12, 2026

(54) SUPPORT AND COUPLING INTERFACES FOR MEDICAL BEDS

(71) Applicant: Dawn Patrol Accessories LLC, Fallbrook, CA (US)

(72) Inventor: Donald G. Webb, II, Fallbrook, CA (US)

(73) Assignee: Dawn Patrol Accessories LLC, Fallbrook, CA (US)

( * ) Notice: Subject to any disclaimer, the term of this patent is extended or adjusted under 35 U.S.C. 154(b) by 40 days.

(21) Appl. No.: 18/541,552

(22) Filed: Dec. 15, 2023

(65) Prior Publication Data

US 2024/0197550 A1     Jun. 20, 2024

Related U.S. Application Data

(60) Provisional application No. 63/387,892, filed on Dec. 16, 2022.

(51) Int. Cl.
   *A61G 7/05*     (2006.01)
   *F16M 13/02*     (2006.01)
(52) U.S. Cl.
   CPC .............. *A61G 7/05* (2013.01); *F16M 13/02* (2013.01); *A61G 2203/20* (2013.01)
(58) Field of Classification Search
   CPC .... A61G 7/05; A61G 2203/20; A61G 7/0506; F16M 13/02
   USPC ................................ 248/205.1; 5/503.1, 658
   See application file for complete search history.

(56) References Cited

U.S. PATENT DOCUMENTS

| | | | | |
|---|---|---|---|---|
| 4,410,158 A | * | 10/1983 | Maffei | F16M 11/2014 248/214 |
| 5,344,169 A | * | 9/1994 | Pryor | A61G 12/008 5/503.1 |
| 5,997,147 A | * | 12/1999 | Tatoian | G02B 7/1824 359/857 |
| 6,131,868 A | * | 10/2000 | Welling | G10L 15/26 5/503.1 |
| 6,850,288 B2 | * | 2/2005 | Kurokawa | F16M 13/022 348/836 |
| 7,418,747 B1 | * | 9/2008 | Myers | A47C 21/003 5/503.1 |
| 7,857,265 B1 | * | 12/2010 | Adkisson | F16M 11/2014 248/125.7 |
| 8,177,065 B1 | * | 5/2012 | Thomas | A47C 19/22 5/503.1 |

(Continued)

*Primary Examiner* — Taylor Morris
(74) *Attorney, Agent, or Firm* — Knobbe, Martens, Olson & Bear, LLP

(57) ABSTRACT

A support and coupling interface system for medical beds can include a base plate that includes a set of at least four perimeter apertures, a set of dampening apertures each disposed nearer a center of the base plate than each of the set of perimeter apertures, and a set of coupling elements configured to couple the base plate to a foot board of the medical bed via respective dampening apertures of the set of dampening apertures. The system can also include a coupling plate that is configured to couple a display interface to a face of the coupling plate. The face of the coupling plate can be disposed between a top edge and a bottom edge of the coupling plate. The system can also include a support post extending vertically along a vertical axis and connecting the base plate to the coupling plate.

19 Claims, 7 Drawing Sheets

(56)          References Cited

U.S. PATENT DOCUMENTS

| | | | | |
|---|---|---|---|---|
| 8,408,504 | B1 * | 4/2013 | Gonzales | F16M 11/10 |
| | | | | 5/503.1 |
| 8,628,050 | B2 * | 1/2014 | Truckor | A47B 96/06 |
| | | | | 248/295.11 |
| 8,813,656 | B1 * | 8/2014 | Hazzard | A47B 81/06 |
| | | | | 108/50.01 |
| 9,518,695 | B2 * | 12/2016 | Whalen | F16M 11/28 |
| 10,113,687 | B2 * | 10/2018 | Wise | F16M 13/02 |
| 12,458,552 | B2 * | 11/2025 | Aristide | A61G 7/05 |
| 2004/0073931 | A1 * | 4/2004 | Trussell, Jr. | F16M 11/105 |
| | | | | 348/E5.133 |
| 2011/0101179 | A1 * | 5/2011 | Fritch | F16M 13/02 |
| | | | | 248/125.7 |
| 2013/0314866 | A1 * | 11/2013 | Millman | A61M 21/02 |
| | | | | 361/679.02 |
| 2018/0235361 | A1 * | 8/2018 | Ching | A47B 21/06 |
| 2020/0000225 | A1 * | 1/2020 | Whalen | A47B 81/00 |
| 2022/0408923 | A1 * | 12/2022 | Stravitz | F16M 11/22 |

* cited by examiner

112

144

1" 1/2

9" 1/2

1" 1/2 x 1" 1/2 x 35" 7/8

104

2" 1/2

3" 3/4

6"

17"

24" 1/4

27" 3/4

35"

SUPPORT AND COUPLING INTERFACES FOR MEDICAL BEDS

INCORPORATION BY REFERENCE TO ANY PRIORITY APPLICATIONS

This application claims the benefit of priority to U.S. Provisional Patent Application No. 63/387,892, filed Dec. 16, 2022. Any and all applications for which a foreign or domestic priority claim is identified in the Application Data Sheet as filed with the present application are hereby incorporated by reference under 37 CFR 1.57.

BACKGROUND

Field

This disclosure relates generally to medical bed structures and more particularly to support and coupling interfaces for medical beds.

Description of Related Art

Medical beds have limits on how they can provide necessary services for patients and the workers.

SUMMARY

Example embodiments described herein have innovative features, no single one of which is indispensable or solely responsible for their desirable attributes. Without limiting the scope of the claims, some of the advantageous features will now be summarized.

In some embodiments, a support and coupling interface system for medical beds can include a base plate that includes a set of at least four perimeter apertures, a set of dampening apertures each disposed nearer a center of the base plate than each of the set of perimeter apertures, and a set of coupling elements configured to couple the base plate to a foot board of the medical bed via respective dampening apertures of the set of dampening apertures. The system can also include a coupling plate that is configured to couple a display interface to a face of the coupling plate. The face of the coupling plate can be disposed between a top edge and a bottom edge of the coupling plate. The system can also include a support post extending vertically along a vertical axis and connecting the base plate to the coupling plate.

BRIEF DESCRIPTION OF THE DRAWINGS

The following drawings and the associated descriptions are provided to illustrate embodiments of the present disclosure and do not limit the scope of the claims.

These and other features will now be described with reference to the drawings summarized above. The drawings and the associated descriptions are provided to illustrate embodiments and not to limit the scope of any claim. Throughout the drawings, reference numbers may be reused to indicate correspondence between referenced elements.

DETAILED DESCRIPTION

Although certain embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein (e.g., for manufacture or assembly of the systems described), the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Described herein are systems for support and coupling interface systems for medical beds. Because of the unique nature of medical beds in contrast to other structures, and/or because of the unique demands, dimensions, and restrictions of medical rooms, medical personnel, and medical regulations, the dimensions described herein are highly relevant to the systems described herein. Indeed, the specific ranges provided have specific applicability within the context of medical beds and medical rooms in which the beds are operable.

Unless explicitly indicated otherwise, terms as used herein will be understood to imply their customary and ordinary meaning.

Figure 1:
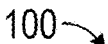
FIG. 1 schematically shows a side view of an example support and coupling interface system coupled to a foot board of a medical bed.
Figure 1:
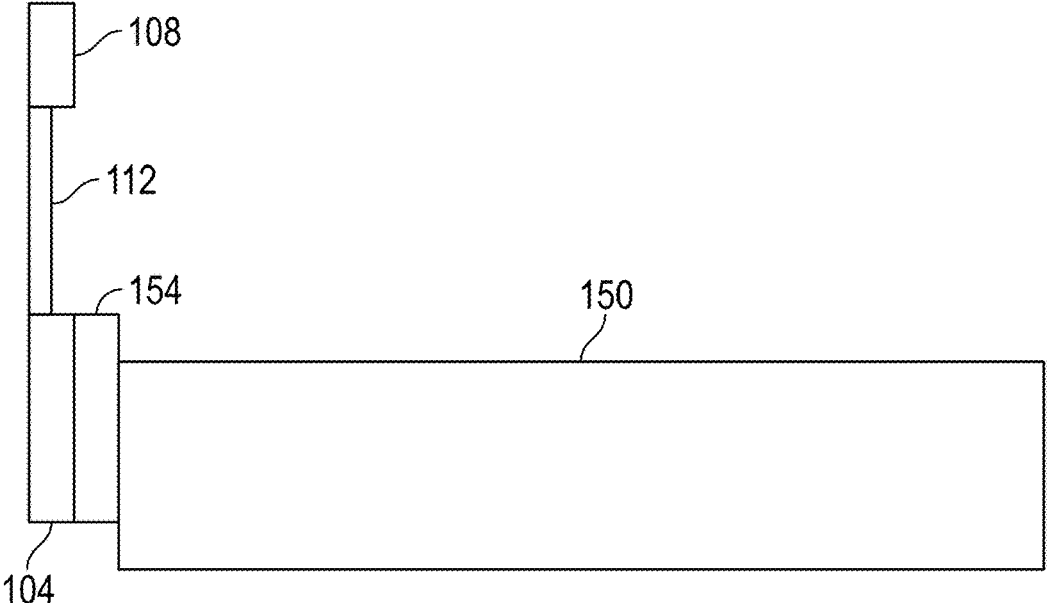

FIG. 1 schematically shows a side view of an example support and coupling interface system coupled to a foot board of a medical bed. The support and coupling interface system 100 can include a base plate 104, a coupling plate 108, and a support post 112. The base plate 104 may be configured to couple to (e.g., adjacent to) a foot board 154 of a medical bed 150. The support post 112 may be disposed between the base plate 104 and the support post 112 and may extend vertically between them.

Figure 2:
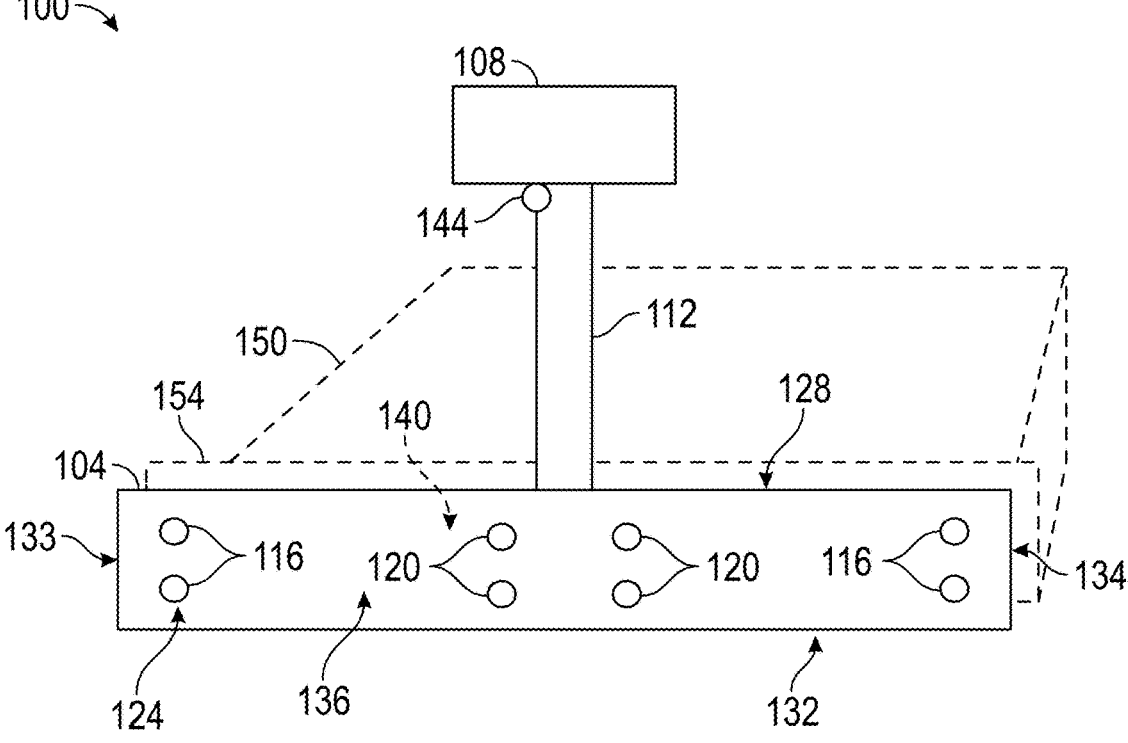
FIG. 2 shows a schematic of a front view of an example support and coupling interface system coupled to a foot board of a medical bed.

FIG. 2 shows a schematic of a front view of an example support and coupling interface system coupled to a foot board of a medical bed. The base plate can have a thickness between a front face 136 and a back face 140 of at least 0.3 mm. A thinner base plate cannot provide the necessary structural integrity to safely support the weight of the coupling plate 108, the support post 112, and a display interface (not shown). The thickness may be between 0.3 mm to 4.6 mm in some embodiments, which may correspond to a metal gauge of between 7-31. The back face 140 can be configured to be coupled to the foot board 154 of the medical bed 150. The base plate can have a top edge 128 and a bottom edge 132 that each extend a length of less than 127 cm. Based on the unique physical limitations of the dimensions of medical beds and medical rooms, lengths greater than 127 cm can create safety hazards to patients and/or medical personnel. In some embodiments the length may be between 30.4 cm and 127 cm. The top edge 128 and bottom edge 132 can connected by a left side edge 133 and a right side edge 134.

The base plate 104 can include a set of at least four perimeter apertures. Each of the set of perimeter apertures 116 may be disposed between 0.635 cm and 7.6 cm within at least one of the top or bottom edges 128, 132 of the base plate 104 and disposed between 0.635 cm and 10.2 cm within at least one of the left or right side edges 133, 134 of the base plate 104. If the perimeter apertures 116 are disposed further away from either the top/bottom edges 128, 132 and/or the left/right edges 133, 134, then the base plate 104 may not be safely coupled to the foot board 154.

A set of dampening apertures 120 may be disposed each nearer a center of the base plate 104 than each of the set of perimeter apertures 116. The dampening apertures 120 may be disposed between 0.635 cm and 7.6 cm within at least one of the top or bottom edges 128, 132 of the base plate 104. Disposing the dampening apertures 120 within that distance from the top or bottom edges 128, 132 of the base plate 104 is important to prevent vibrations of the support and coupling interface system 100 during use. Without the dampening apertures 120 and associated coupling elements, the weight and weight distribution of the support and coupling interface system 100 can create vibrations that disturb the function of the support and coupling interface system 100 and may even undermine the integrity of the couplings between the support and coupling interface system 100 and the medical bed 150.

The support and coupling interface system 100 can include a set of coupling elements 124 that can couple the base plate 104 to the foot board 154 of the medical bed 150 via respective dampening apertures 120 of the set of dampening apertures 120, each of the coupling elements 124 can be configured, when in a coupled state with the base plate, to extend no more than 0.16 cm from the front face. If the coupling elements 124 extend beyond this distance, this arrangement can create a safety hazard for patients and medical personnel.

The support and coupling interface system 100 can include a coupling plate 108 that is configured to couple a display interface (not shown) to a face (e.g., a back face) of the coupling plate 108. The face of the coupling plate 108 may be disposed between a top edge and a bottom edge of the coupling plate 108.

The support and coupling interface system 100 can include a support post 112 that can extend vertically along a vertical axis and connecting the base plate 104 to the coupling plate 108. The vertical axis can extend through a center of the support post 112. The vertical axis can extend laterally within 17.8 cm from a midpoint of the top edge of the base plate 104. If the vertical axis extends beyond this distance, the support and coupling interface system 100 may be structurally unsound and may create a safety issue for medical personnel. The support post 112 can separate the top edge 128 of the base plate from the bottom edge of the coupling plate by between 45.7 cm and 114.3 cm. If the support post 112 is longer or shorter such that the separation is outside this range of separation, then the support and coupling interface system 100 may be structurally unsound (e.g., if longer) or fail to provide the intended benefit of the coupling plate 108 to a display interface (e.g., if shorter). Each of the set of dampening apertures 120 can be disposed within 0.63 cm and 10.2 cm of an edge of the support post 112. Outside this range and the dampening apertures 120 may fail to prevent vibrations of the base plate 104 when the support and coupling interface system 100 is coupled to the foot board 154.

In some embodiments, the support post 112 can include an access aperture 144 that is sized to allow wiring access into an interior of the support post 112, which may be substantially hollow. A center of the access aperture 144 may be disposed within 5.1 cm of the bottom edge of the coupling plate 108. If the center of the access aperture 144 is further away from the bottom edge of the coupling plate 108, then it may allow inadvertent access to wiring cables, which could produce a safety hazard for patients, visitors, and/or medical personnel.

In some embodiments, the base plate 104, the support post 112, and the coupling plate 108 may be a unitary metal element. For example, they may all be welded or otherwise permanently adhered to each other.

Figure 3:
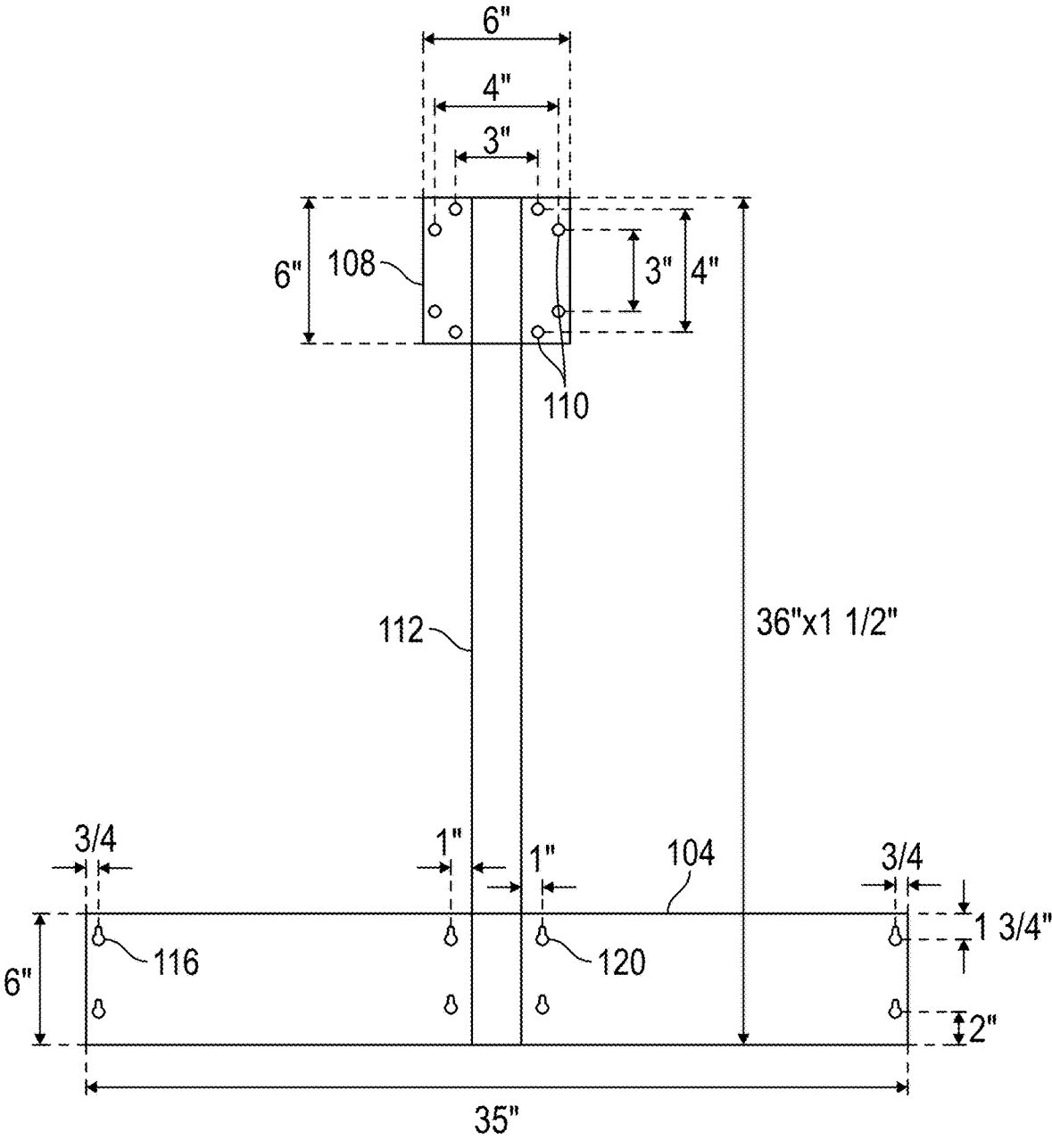
FIG. 3 shows some example arrangements, dimensions, and/or features of a support and coupling interface system, according to an embodiment.

FIGS. 3-7 show some example arrangements, dimensions, and/or features of a support and coupling interface system 100, according to various embodiments. For example, FIG. 3 shows an example support and coupling interface system 100 comprising a base plate 104, a coupling plate 108, and a support post 112. The base plate 104 can include one or more perimeter apertures 116 and/or dampening apertures 120. The perimeter apertures 116 and/or dampening apertures 120 can include a variety of aperture shapes, such as circular, ovular, "tear-drop", "key-hole", and/or another shape. As shown in FIG. 3, the perimeter apertures 116 and dampening apertures 120 include a key-hole shape aperture. This key-hole shape can allow for improved accuracy in assembly and fixture to the medical bed. For example, the base plate 104 may be relatively heavy and may benefit from a tighter fit that can be provided by an upper (e.g., smaller-diameter) portion of the key-hole aperture.

As shown, a lateral distance of the dampening apertures 120 from a nearest edge of the support post 112 may be larger than a lateral distance the perimeter apertures 116 are from a nearest edge of the base plate 104. This difference can help provide improved dampening of vibrations from the support and coupling interface system 100 relative to the medical bed. Additionally or alternatively, this difference can provide improved stability of the coupling between the base plate 104 and the medical bed.

Other dimensions of the apertures relative to other apertures and/or relative to other features of the support and coupling interface system 100 can be an improvement over devices. For example, lower apertures of the perimeter apertures 116 can be further from a lowest edge of the base plate 104 than upper apertures of the perimeter apertures 116 are to a highest edge of the base plate 104. This can accommodate structural requirements of medical beds, provide improved coupling between the base plate 104 and the medical bed, and/or allow for access to coupling elements (e.g., bolts, screws, etc.) in the lower apertures of the perimeter apertures 116.

Figure 4:
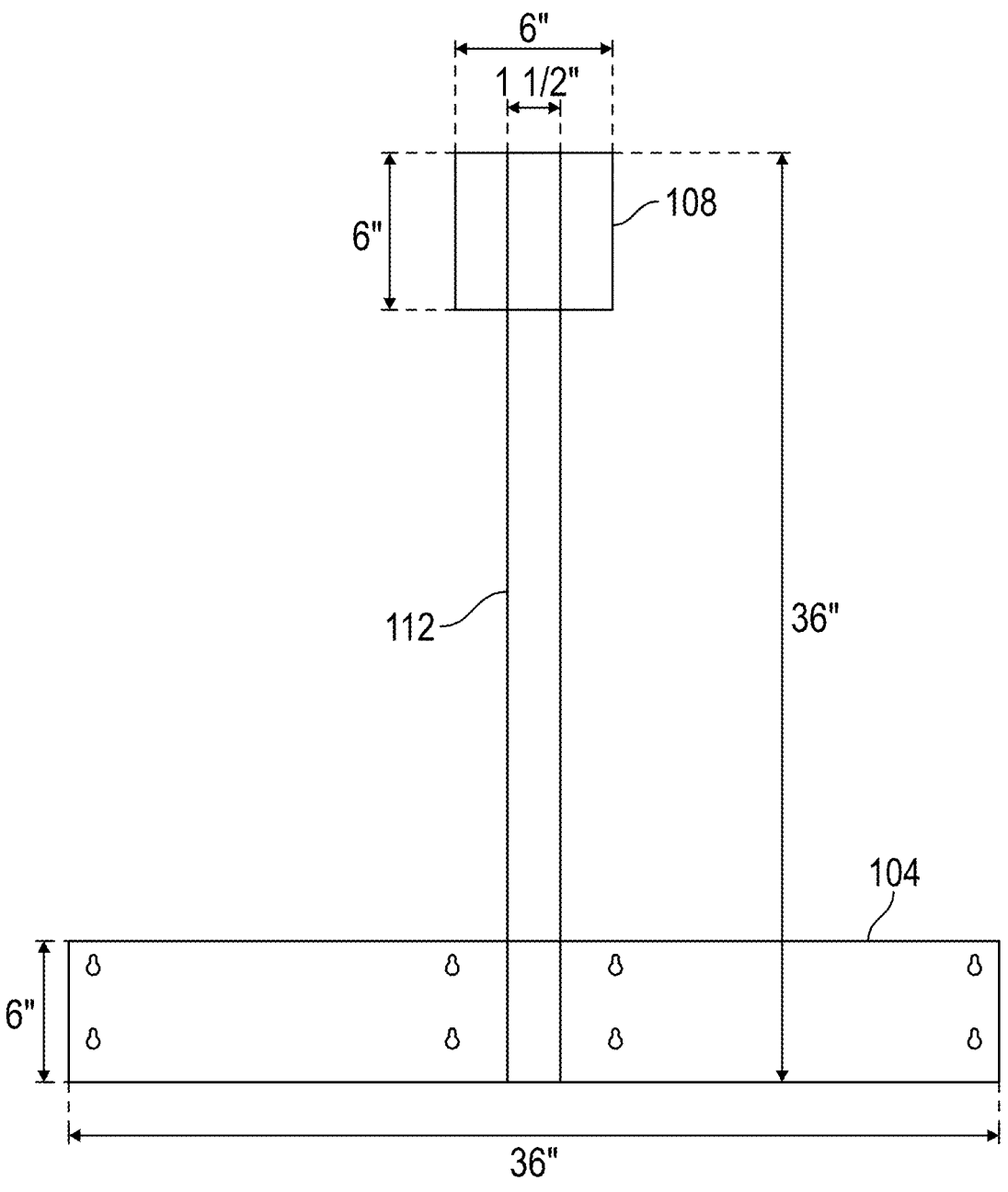
FIG. 4 shows some example arrangements, dimensions, and/or features of a support and coupling interface system, according to an embodiment.

A height of the support post 112 relative to a length of the base plate 104 can be a relevant feature in embodiments of the support and coupling interface system 100. For example, the support post 112 should generally not be too tall relative to the length of the base plate 104. Improved results can be obtained with a ratio of the length of the support post 112 to the length of the base plate 104 being between about 0.85 to about 1.15. This ratio can maintain structural integrity of the support and coupling interface system 100 and avoid or reduce instability of the support and coupling interface system 100. For example, in some embodiments, the ratio is bout 0.95 (e.g., with a height of about 36 inches and a length of about 35 inches). As shown in FIG. 4, in some embodiments, the ratio is about 1.0 (e.g., height of about 36 inches and a length of about 36 inches).

Figure 5:
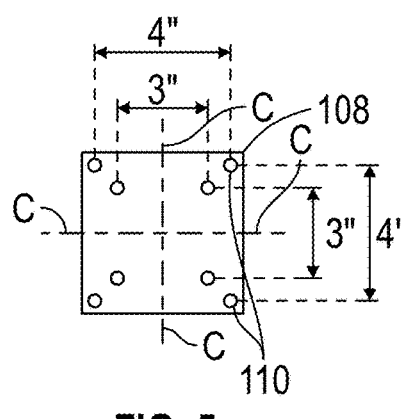
FIG. 5 shows some example arrangements, dimensions, and/or features of a support and coupling interface system, according to an embodiment.
Figure 6:
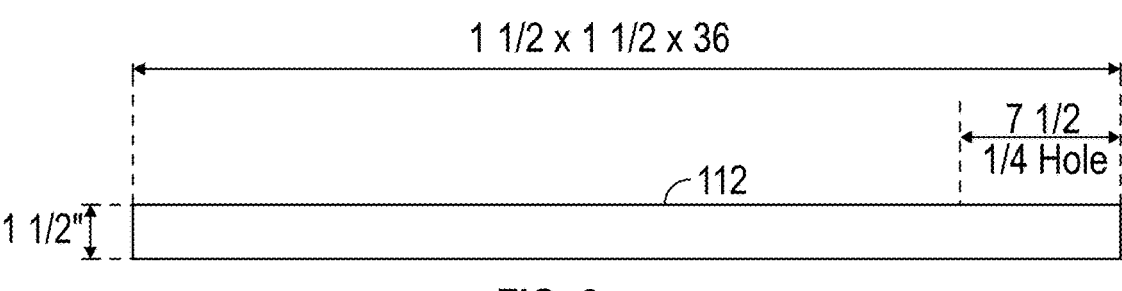
FIG. 6 shows some example arrangements, dimensions, and/or features of a support and coupling interface system, according to an embodiment.
Figure 7:
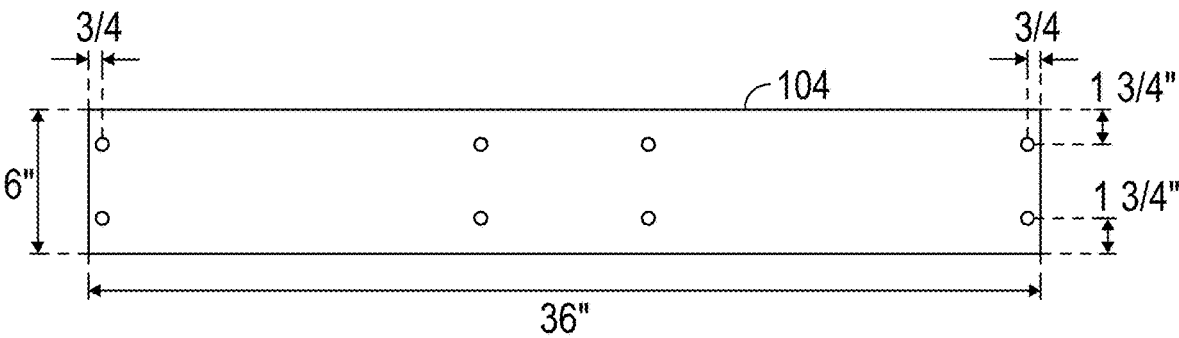
FIG. 7 shows some example arrangements, dimensions, and/or features of a support and coupling interface system, according to an embodiment.

FIG. 5 shows a detail of a front view of an example coupling plate 108. The coupling plate 108 is configured to support a display screen for use by a caretaker (e.g., doctor, nurse, specialist, etc.) and/or a patient. FIG. 6 shows a front view of the support post 112. As shown, the access aperture 144 may be disposed at a small distance below a lower edge of the coupling plate 108. Accordingly, as shown, in some examples the access aperture 144 can be disposed about 7.5 inches below a top of an example support post 112. A diameter of the access aperture 144 can be about a ¼ inch. FIG. 7 shows a front view of a front view of an example base plate 104. As shown, a ratio of a length to a width of the base plate 104 can be about 6 in some embodiments. It can be valuable to keep the ratio of the length to the width to above about 4, as this ratio (or higher) will allow for sufficient support of the support and coupling interface system 100 while also preventing instability of the support post 112. Additionally or alternatively, this ratio can allow for the base plate 104 to be properly coupled to a medical bed without either being unable to be coupled to the medical bed or losing structural integrity of the support and coupling interface system 100.

Figure 8:
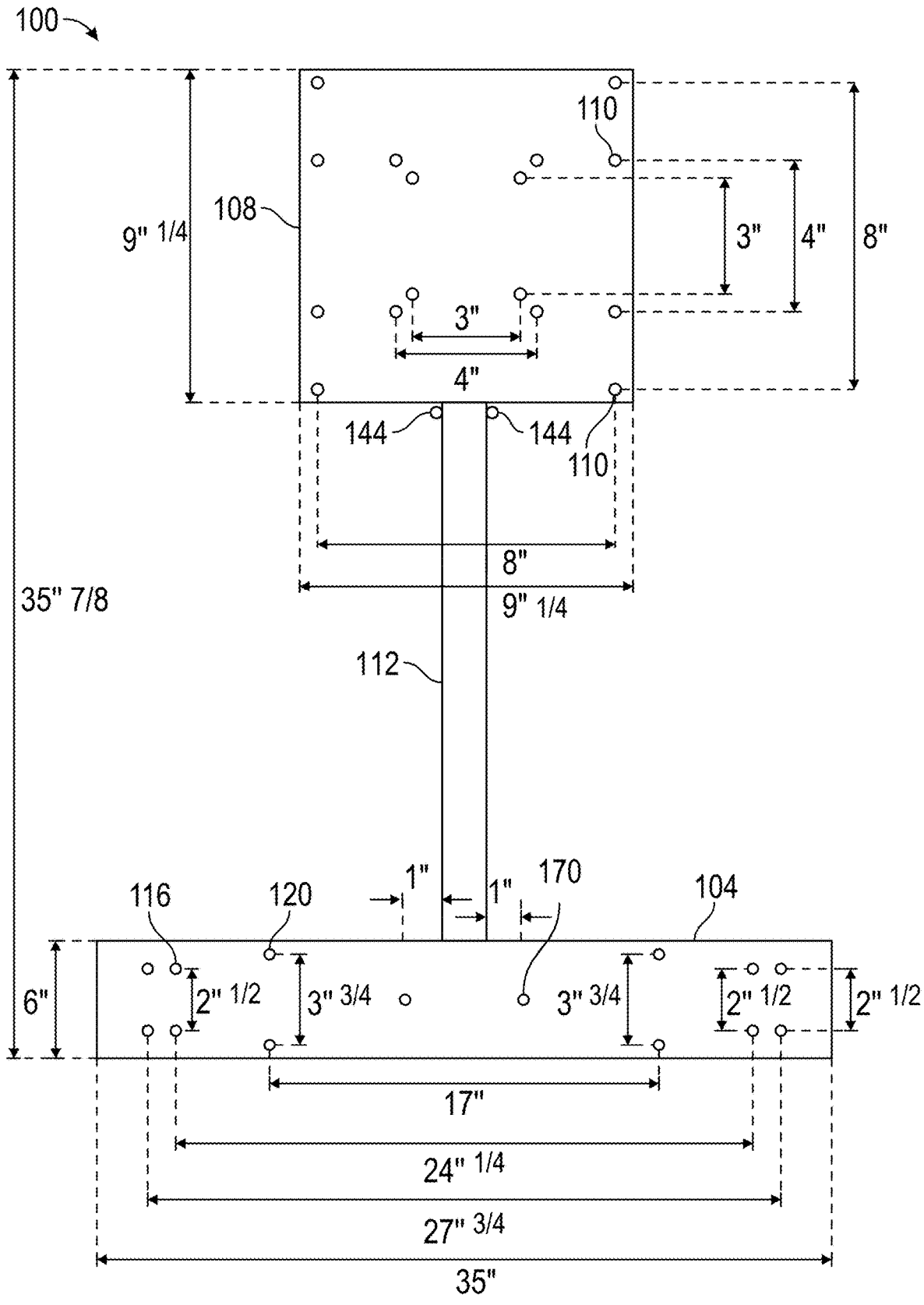
FIG. 8 shows another example support and coupling interface system, according to an embodiment.
Figure 9:
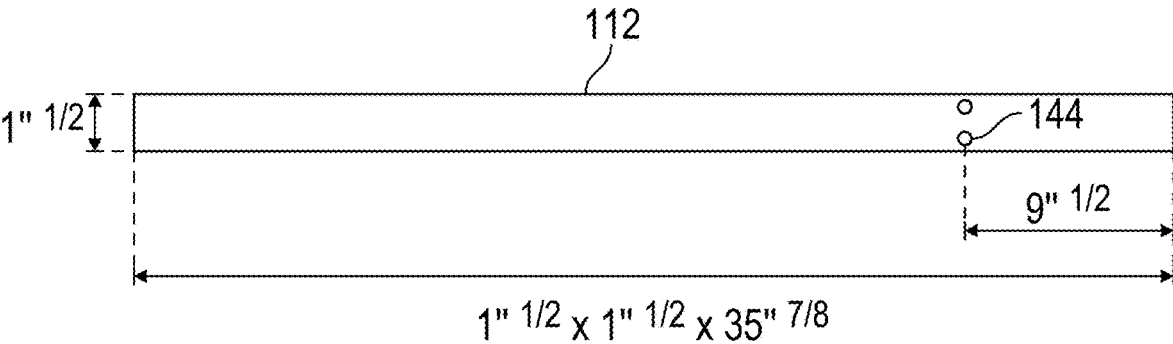
FIG. 9 shows another example support post and base plate, according to an embodiment.
Figure 9:
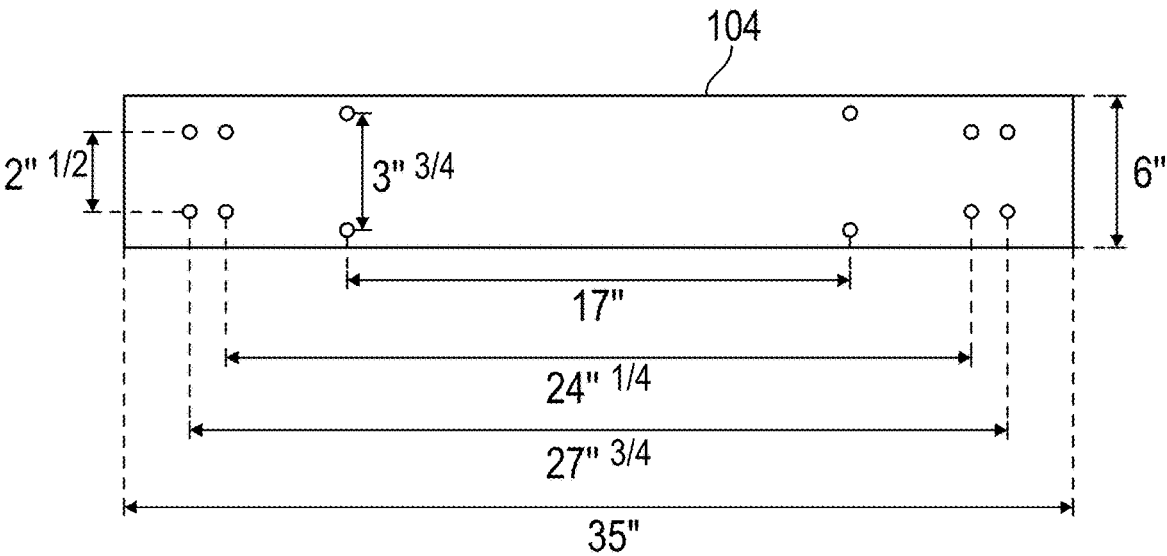
Figure 10:
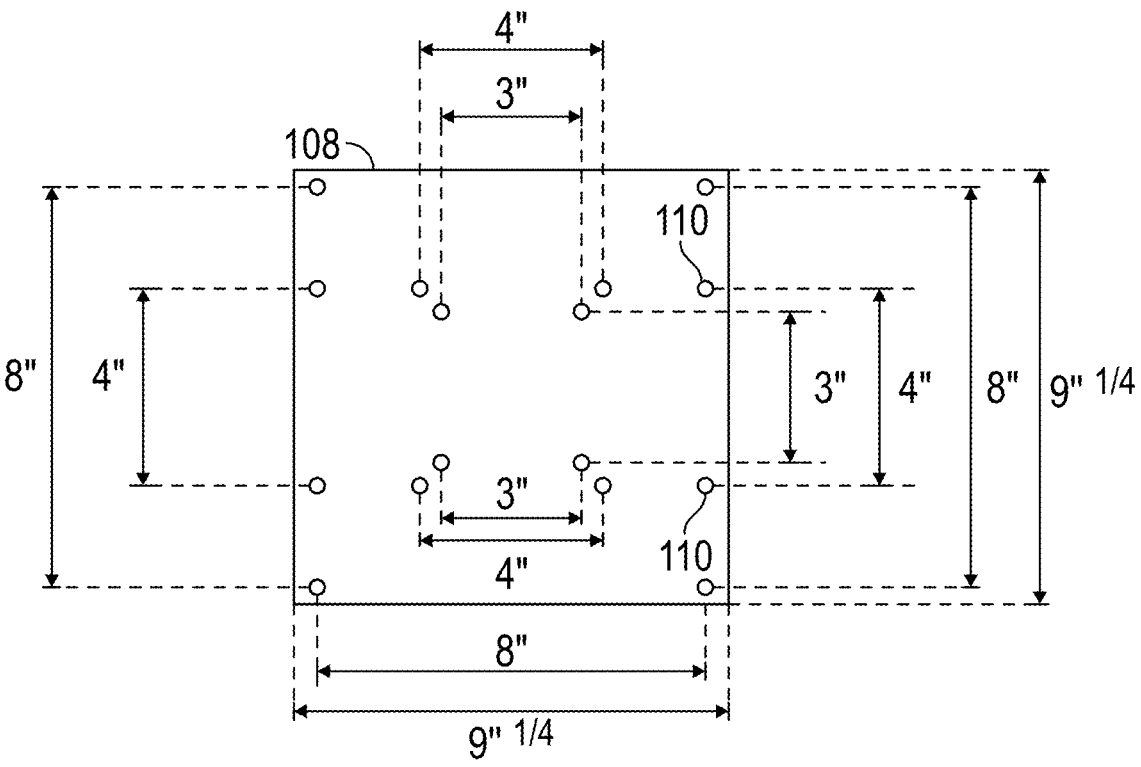
FIG. 10 shows another example coupling plate, according to an embodiment.

FIGS. 8-10 show another example embodiment of a support and coupling interface system 100, according to some implementations. As shown in FIG. 8, the coupling plate 108 can be larger than 9 inches (e.g., 9¼ inches) along one dimension. In some embodiments, a face of the coupling plate 108 is generally square. The coupling plate 108 can include a plurality of coupling apertures 110. A first set of coupling apertures 110 can each be about 3 inches from one another, as shown. Additionally or alternatively, a second set of coupling apertures 110 can disposed about 4 inches from another. Additionally or alternatively, a third set of coupling apertures 110 can disposed about 8 inches away from one another. In some embodiments, each of the first, second, and/or third sets of coupling apertures 110 can be disposed those distances from each other along two orthogonal axes. In some embodiments, a ratio of distances between apertures within a set of coupling apertures 110 compared to distances between apertures within a different set of coupling apertures 110 can be about ⅜, about ¾, and/or about ½ in some embodiments. Additionally or alternatively, the ratio of two of the coupling apertures 110 disposed from a center of the coupling plate 108 can be about ⅜, about ¾, and/or about ½ in some embodiments. These ratios can be beneficial for providing proper coupling opportunities for appropriate medical display interfaces and/or to provide sufficient structural integrity for the coupling so that the integrity of the coupling of a display device does not fail and cause injury to a patient and/or caretaker, depending on the ratio.

As shown in FIG. 8, the support post 112 can have a plurality of access apertures 144. For example, each access aperture 144 can be disposed below a face of the coupling plate 108 and/or may be opposite each other. Each access aperture 144 can be configured to allow electrical access into the support post 112, which may be hollow along the length of it.

The base plate 104 can include a plurality of perimeter apertures 116, dampening apertures 120, and/or bracing apertures 170. The base plate 104 can include, for example, a first set of perimeter apertures 116 near one end of the base plate 104 and a second set of perimeter apertures 116 near an opposite end of the base plate 104. Each set of perimeter apertures 116 can include two or preferably four perimeter apertures 116, which can result in a total of four or eight perimeter apertures 116. Vertically neighboring apertures perimeter apertures 116 within a set can be spaced by about 2½ inches. These can correlate to a structural relationship helpful to ensure proper structural integrity at or near the ends of the base plate 104. Additionally or alternatively, these distances may correlate to size specifications of medical beds. As noted above, one or more of the perimeter apertures 116 can include a circular, ovular, and/or more complex shape (e.g., keyhole, teardrop, cross, etc.).

Additionally or alternatively, the base plate 104 can include one or more sets of dampening apertures 120. The dampening apertures 120 can be configured to prevent vibrations from undermining the coupling between the base plate 104 and the medical bed. Additionally or alternatively, the dampening apertures 120 can enhance a user interaction with a display interface coupled to the coupling plate 108 and/or help ensure clarity of the display interface to a user (e.g., prevent vibrations from interfering with a signal from the display interface).

In some embodiments, the base plate 104 can additionally or alternatively include one or more bracing apertures 170. The bracing apertures 170 can provide helpful redundancy to the integrity of the coupling between the base plate 104 and the medical bed. It can be particularly beneficial if the bracing apertures 170 are disposed less than about 2 inches from a corresponding edge of the support post 112. For example, as shown, the bracing apertures 170 may be disposed about 1 inch from either outer edge of the support post 112. This close distance can provide sufficient redundancy.

FIG. 9 shows a detail of an example dampening apertures 120 and example support post 112, according to some embodiments. As shown, each access aperture 144 may be disposed about 9½ inches below a top of the support post 112. FIG. 10 shows a detail of an example coupling plate 108, according to some embodiments.

Although variable reference to inches or centimeters has been given throughout, it should be noted that such distances can be readily converted to other units of measurement.

OTHER CONSIDERATIONS

Reference throughout this specification to "some embodiments" or "an embodiment" means that a particular feature, structure or characteristic described in connection with the embodiment is included in at least some embodiments.

Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment. Accordingly, no feature or group of features is necessary or indispensable to each embodiment.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A support and coupling interface system for medical beds, the system comprising:

a base plate having a thickness between a front face and a back face of at least 0.9 mm, the back face configured to be coupled to a foot board of a medical bed, the base plate having a top edge and a bottom edge each extending a length of less than 127 cm, the top and bottom edges connected by a left side edge and a right side edge, the base plate comprising:

a set of at least four perimeter apertures, each of the set of perimeter apertures being disposed between 0.635 cm and 7.6 cm away from at least one of the top or bottom edges of the base plate and disposed between 0.635 cm and 10.2 cm away from at least one of the left or right side edges of the base plate;

a set of dampening apertures each disposed nearer a center of the base plate than each of the set of perimeter apertures; and a set of coupling elements configured to couple the base plate to the foot board of the medical bed via respective dampening apertures of the set of dampening apertures and via respective perimeter apertures of the set of at least four perimeter apertures, each of the coupling elements configured, in a coupled state with the base plate, to extend no more than 0.16 cm from the front face;

a coupling plate configured to couple a display interface to a face of the coupling plate, the face of the coupling plate disposed between a top edge and a bottom edge of the coupling plate; and a support post configured to position the coupling plate and the display interface directly above the foot board of the medical bed by extending vertically along a vertical axis and connecting the base plate to the coupling plate, the vertical axis disposed laterally within 17.8 cm from a midpoint of the top edge of the base plate, the support post extending from the top edge of the base plate to the bottom edge of the coupling plate by between 45.7 cm and 114.3 cm, each of the set of dampening apertures disposed within 0.63 cm and 10.2 cm of an edge of the support post, the support post comprising an access aperture sized to allow wiring access into an interior of the support post, a center of the access aperture disposed within 5.1 cm of the bottom edge of the coupling plate, wherein the base plate, the support post, and the coupling plate are a unitary metal element.

2. A support and coupling interface system for medical beds, the system comprising:

a base plate having a front face and a back face, the back face configured to be coupled to a foot board of a medical bed, the base plate having a top edge and a bottom edge, the top and bottom edges connected by a left side edge and a right side edge, the base plate comprising:

a set of at least four perimeter apertures, each of the set of perimeter apertures being disposed a vertical distance away from at least one of the top or bottom edges of the base plate and disposed a horizontal distance away from at least one of the left or right side edges of the base plate;

a set of dampening apertures each disposed nearer a lateral center of the base plate than each of the set of at least four perimeter apertures; and a set of coupling elements configured to couple the base plate to the foot board of the medical bed via respective dampening apertures of the set of dampening apertures;

a coupling plate configured to couple a display interface to a face of the coupling plate, the face of the coupling plate disposed between a top edge and a bottom edge of the coupling plate; and a support post configured to position the coupling plate and the display interface directly above the foot board of the medical bed by extending vertically along a vertical axis, thereby positioning the coupling plate above the base plate and reducing vibrational effects on the display interface from movement of the medical bed, and connecting the base plate to the coupling plate.

3. The support and coupling interface system of claim 2, wherein a thickness between a front face and a back face is at least 0.3 mm.

4. The support and coupling interface system of claim 2, wherein the top edge and the bottom edge each extend a length of less than 127 cm.

5. The support and coupling interface system of claim 2, wherein each of the set of perimeter apertures are disposed between 0.635 cm and 7.6 cm away from at least one of the top or bottom edges of the base plate.

6. The support and coupling interface system of claim 2, wherein each of the set of perimeter apertures is disposed between 0.635 cm and 10.2 cm away from at least one of the left or right side edges of the base plate.

7. The support and coupling interface system of claim 2, wherein each of the coupling elements is configured, in a coupled state with the base plate, to extend no more than 0.16 cm from the front face.

8. The support and coupling interface system of claim 2, wherein the vertical axis is disposed laterally within 17.8 cm from a midpoint of the top edge of the base plate.

9. The support and coupling interface system of claim 2, wherein the support post extends from the top edge of the base plate to the bottom edge of the coupling plate by between 45.7 cm and 114.3 cm.

10. The support and coupling interface system of claim 2, wherein the support post comprises an access aperture sized to allow wiring access into an interior of the support post.

11. The support and coupling interface system of claim 10, wherein a center of the access aperture is disposed within 5.1 cm of bottom edge of the coupling plate.

12. The support and coupling interface system of claim 2, wherein the base plate, the support post, and the coupling plate are a unitary metal element.

13. The support and coupling interface system of claim 2, wherein the coupling plate further comprises a plurality of coupling apertures configured to receive corresponding coupling elements therethrough to couple the display interface to the coupling plate.

14. The support and coupling interface system of claim 13, wherein a first distance of a first aperture of the plurality of coupling apertures to a center of the coupling plate is different from a second distance of a second aperture of the plurality of coupling apertures, wherein the first distance is different from the second distance are disposed at a ratio of about ½.

15. The support and coupling interface system of claim 2, wherein the base plate further comprises a plurality of bracing apertures each disposed within 5.1 cm from a nearest edge of the support post, each of the bracing apertures configured to receive corresponding coupling elements therethrough to provide redundancy to a coupling between the base plate and the medical bed.

16. The support and coupling interface system of claim 2, wherein the support post does not extend forward of the foot board toward a headboard of the medical bed and thereby limits harmful contact by a medical patient or healthcare provider with the coupling plate or the display interface.

17. The support and coupling interface system of claim 2, wherein the set perimeter apertures comprise at least two apertures vertically aligned with each other and the set of dampening apertures comprises at least two apertures not vertically aligned with the set of perimeter apertures.

18. The support and coupling interface system of claim 17, wherein the set of dampening apertures is disposed each nearer the lateral center of the base plate than each of the set of perimeter apertures.

19. The support and coupling interface system of claim 17, wherein the set of dampening apertures is disposed each farther from the vertical center of the base plate than each of the set of perimeter apertures.

\* \* \* \* \*